United States Patent
DePaoli et al.

(10) Patent No.: US 11,371,423 B2
(45) Date of Patent: Jun. 28, 2022

(54) WASTEGATE ASSEMBLY

(71) Applicants: BorgWarner Inc., Auburn Hills, MI (US); GM Global Technology Operations LLC, Detroit, MI (US)

(72) Inventors: Dominic William DePaoli, Horse Shoe, NC (US); Aaron Date, Asheville, NC (US); Michael Daniel Cola, Fletcher, NC (US); Grant W. Brady, Warren, MI (US)

(73) Assignees: BorgWarner Inc., Auburn Hills, MI (US); GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/269,362

(22) PCT Filed: Sep. 20, 2019

(86) PCT No.: PCT/US2019/052079
§ 371 (c)(1),
(2) Date: Feb. 18, 2021

(87) PCT Pub. No.: WO2020/061407
PCT Pub. Date: Mar. 26, 2020

(65) Prior Publication Data
US 2021/0340900 A1 Nov. 4, 2021

Related U.S. Application Data

(60) Provisional application No. 62/734,529, filed on Sep. 21, 2018.

(51) Int. Cl.
*F02B 37/18* (2006.01)

(52) U.S. Cl.
CPC .................. *F02B 37/186* (2013.01)

(58) Field of Classification Search
CPC .............................. F02B 37/183; F02B 37/186
See application file for complete search history.

(56) References Cited

U.S. PATENT DOCUMENTS

| 2,565,108 A | 8/1951 | Zahodiakin |
| 5,112,178 A | 5/1992 | Overhues et al. |
| (Continued) | | |

FOREIGN PATENT DOCUMENTS

| DE | 102010038908 A1 | 2/2012 |
| DE | 102011076361 A1 | 11/2012 |
| (Continued) | | |

OTHER PUBLICATIONS

English language abstract and machine-assisted English translation for DE 10 2018 204 251 A1 extracted from espacenet.com database on Sep. 9, 2021, 13 pages.

(Continued)

*Primary Examiner* — Ngoc T Nguyen
(74) *Attorney, Agent, or Firm* — Howard & Howard Attorneys PLLC

(57) ABSTRACT

A wastegate assembly for controlling flow of exhaust gas includes a valve element having a valve body and a valve shaft. The wastegate assembly further includes a spindle having a head defining an opening for receiving the valve shaft. The wastegate assembly further includes a washer coupled to the valve shaft and spaced from the spindle such that the spindle is disposed between the valve body and the washer. The spindle head or the washer includes a raised lip extending towards the other of the spindle head or the washer, with the other of the spindle head or the washer defining a notch configured to at least partially receive the raised lip and configured to cooperate with the raised lip to shield the biasing member from exhaust gas and high temperatures.

20 Claims, 3 Drawing Sheets

(56) References Cited

U.S. PATENT DOCUMENTS

| | | | |
|---|---|---|---|
| 5,282,710 | A | 2/1994 | Triesethau |
| 8,500,108 | B2 | 8/2013 | Rode |
| 8,820,709 | B2 | 9/2014 | Lombard et al. |
| 9,127,590 | B2 | 9/2015 | Schoenherr et al. |
| 9,222,406 | B2 | 12/2015 | Lombard et al. |
| 9,464,565 | B2 | 10/2016 | Yamaguchi et al. |
| 9,593,624 | B2 | 3/2017 | Segawa |
| 9,631,628 | B2 | 4/2017 | Takahashi et al. |
| 10,024,229 | B2 | 7/2018 | Byon |
| 10,302,010 | B2 | 5/2019 | Diemer et al. |
| 10,605,115 | B2 | 3/2020 | Iwata |
| 10,920,660 | B2 | 2/2021 | Schawer et al. |
| 2011/0037210 | A1 | 2/2011 | Rode |
| 2012/0234002 | A1 | 9/2012 | Lombard et al. |
| 2013/0189072 | A1 | 7/2013 | Wade |
| 2014/0366530 | A1 | 12/2014 | Murayama et al. |
| 2015/0285133 | A1 | 10/2015 | Byon |
| 2018/0080370 | A1 | 3/2018 | Genin et al. |
| 2018/0094573 | A1 | 4/2018 | Schoenherr et al. |
| 2018/0223727 | A1* | 8/2018 | Nakajima ............ F02B 37/186 |
| 2018/0230848 | A1* | 8/2018 | Iwata .................. F16K 1/2007 |
| 2019/0003376 | A1 | 1/2019 | Schawer et al. |
| 2019/0136753 | A1 | 5/2019 | Li et al. |
| 2019/0195270 | A1 | 6/2019 | Lee et al. |
| 2021/0033001 | A1 | 2/2021 | Kato et al. |
| 2021/0087968 | A1* | 3/2021 | DePaoli .................. F16F 1/32 |
| 2021/0108558 | A1 | 4/2021 | Huh |
| 2021/0317777 | A1* | 10/2021 | DePaoli ............... F01D 17/105 |

FOREIGN PATENT DOCUMENTS

| | | | |
|---|---|---|---|
| DE | 102013200832 | A1 | 7/2013 |
| DE | 102013200065 | A1 | 7/2014 |
| DE | 102016100900 | A1 | 7/2017 |
| DE | 202017105056 | U1 | 9/2017 |
| DE | 202018002846 | U1 | 6/2018 |
| DE | 102017202137 | A1 | 8/2018 |
| DE | 102018103283 | A1 | 8/2018 |
| DE | 102018204251 | A1 | 9/2019 |
| EP | 2508730 | B1 | 6/2014 |
| EP | 3211197 | A1 | 8/2017 |
| JP | S61033923 | U | 3/1986 |
| JP | 2006097693 | A | 4/2006 |
| JP | 2013155687 | A | 8/2013 |
| WO | 2010135104 | A2 | 11/2010 |
| WO | 2013133371 | A1 | 9/2013 |
| WO | 2014011468 | A1 | 1/2014 |
| WO | 2019072486 | A1 | 4/2019 |
| WO | 2019105853 | A1 | 6/2019 |

OTHER PUBLICATIONS

International Search Report for Application No. PCT/US2019/052079 dated Jan. 2, 2020, 2 pages.
International Search Report for Application No. PCT/US2019/052145 dated Dec. 4, 2019, 3 pages.
U.S. Appl. No. 17/019,820, filed Sep. 14, 2020.
U.S. Appl. No. 17/271,911, filed Feb. 26, 2021.
English language abstract and machine-assisted English translation for DE 10 2010 038 908 A1 extracted from espacenet.com database on Mar. 1, 2021, 7 pages.
English language abstract and machine-assisted English translation for DE 10 2011 076 361 A1 extracted from espacenet.com database on Mar. 1, 2021, 10 pages.
Machine-assisted English language abstract for DE 10 2013 200 832 A1 extracted from espacenet.com database on Mar. 1, 2021, 2 pages.
English language abstract and machine-assisted English translation for DE 10 2013 200 065 A1 extracted from espacenet.com database on Mar. 1, 2021, 11 pages.
Machine-assisted English language abstract for DE 10 2016 100 900 A1 extracted from espacenet.com database on Mar. 1, 2021, 2 pages.
Machine-assisted English language abstract and machine-assisted English translation for DE 20 2017 105 056 U1 extracted from espacenet.com database on Mar. 1, 2021, 13 pages.
Machine-assisted English language abstract and machine-assisted English translation for DE 20 2018 002 846 U1 extracted from espacenet.com database on Mar. 1, 2021, 14 pages.
English language abstract for DE 10 2018 103 283 A1 extracted from espacenet.com database on Mar. 1, 2021, 1 page.
English language abstract and machine-assisted English translation for DE 10 2017 202 137 A1 extracted from espacenet.com database on Mar. 1, 2021, 15 pages.
Machine-assisted English language abstract for EP 3 211 197 A1 extracted from espacenet.com database on Mar. 1, 2021, 2 pages.
Machine-assisted English language translation for JPS 61-033923 U extracted from espacenet.com database on Mar. 4, 2021, 3 pages.
English language abstract and machine-assisted English translation for JP 2006-047693 A extracted from espacenet.com database on Mar. 1, 2021, 11 pages.
English language abstract for JP 2013-155687 A extracted from espacenet.com database on Mar. 1, 2021, 1 page.
English language abstract for WO 2013/133371 A1 extracted from espacenet.com database on Mar. 1, 2021, 2 pages.
English language abstract for WO 2019/072486 A1 extracted from espacenet.com database on Mar. 1, 2021, 2 pages.
English language abstract and machine-assisted English translation for WO 2019/105853 A1DE 10 2017 202 137 A1 extracted from espacenet.com database on Mar. 1, 2021, 15 pages.

* cited by examiner

WASTEGATE ASSEMBLY

CROSS-REFERENCE TO RELATED APPLICATIONS

This application is the National Stage of International Application No. PCT/US2019/052079 filed on Sep. 20, 2019, which claims priority to and all the benefits of U.S. Provisional Patent Application No. 62/734,529 filed on Sep. 21, 2018. The entire contents of these applications are incorporated herein by reference in their entirety.

FIELD OF THE DISCLOSURE

The following disclosure is generally directed to a wastegate assembly for a turbocharger.

BACKGROUND OF THE DISCLOSURE

Wastegate assemblies are exposed to high temperatures and corrosive exhaust gas. The high temperatures and corrosive exhaust gas may degrade certain components of the wastegate assembly and thereby reduce the service life of the wastegate assembly. This degradation may be particularly acute when the wastegate assembly includes a biasing member (e.g. a spring). Thus, there remains an opportunity to develop a wastegate assembly including a biasing member that has improved durability and service life.

SUMMARY OF THE DISCLOSURE AND ADVANTAGES

A wastegate assembly for controlling the flow of exhaust gas from an internal combustion engine and through a wastegate channel of a turbocharger is disclosed herein. The wastegate includes a valve element having a valve body and a valve shaft extending away from the valve body. The valve shaft extends along an axis. The valve element is moveable between a first position and a second position to control the flow of exhaust gas through the wastegate channel of the turbocharger. The wastegate assembly further includes a spindle having a head defining an opening for receiving the valve shaft and for moving the valve element between the first and second positions. The wastegate assembly further includes a washer coupled to the valve shaft and spaced from the spindle along the axis such that the spindle is disposed between the valve body and the washer for securing the spindle to the valve shaft. The wastegate assembly further includes a biasing member disposed between the spindle and the washer. The spindle head or the washer includes a raised lip extending towards the other of the spindle head or the washer, with the other of the spindle head or the washer defining a notch configured to at least partially receive the raised lip and configured to cooperate with the raised lip to shield the biasing member from the exhaust gas and high temperatures, thereby prolonging the service life of the biasing member. In other words, the cooperation of the raised lip and notch essentially serve as a protective shield for reducing the exposure of the biasing member to high temperatures and/or corrosive exhaust gas.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

In exhaust gas turbocharging, some of the exhaust gas flow, which would normally be exhausted to the environment and wasted, is used to drive a turbine. The turbine includes a turbine wheel that is mounted on a shaft and is rotatably driven by exhaust gas flow. The turbocharger returns some of this normally-wasted exhaust gas energy back into the engine, contributing to the engine's efficiency and saving fuel. A compressor, which is driven by the turbine, draws in filtered ambient air, compresses it, and then supplies the compressed air to the engine. The compressor includes a compressor wheel that is mounted on the same shaft so that rotation of the turbine wheel causes rotation of the compressor wheel.

This disclosure focuses on a wastegate assembly 10 for selectively bypassing a portion of the exhaust gas. By selectively allowing exhaust gas to bypass the turbine wheel, the wastegate assembly 10 selectively reduces the turbocharger's output (or boost). Thus, the wastegate assembly 10 regulates exhaust gas flow and ensures that the turbine wheel is spun at a desirable speed. Said differently, the wastegate assembly 10 regulates exhaust gas flow to prevent the turbine wheel from being spun at an undesirable speed.

A turbocharger with the wastegate assembly 10 often has an actuator (e.g. a mechanical actuator) for controlling the wastegate assembly 10. In other words, the actuator moves the wastegate assembly 10 between a first position and a second position. The first position is the closed position, which allows the full volume of exhaust gas to pass through to the turbocharger. The second position is an open position, which may permit the full volume of exhaust gas to bypass the turbocharger. Of course, the actuator my also position the wastegate assembly 10 in a position between the first and second positions to bypass a portion of the volume of exhaust gas (e.g. 30% by volume).

Figure 1:
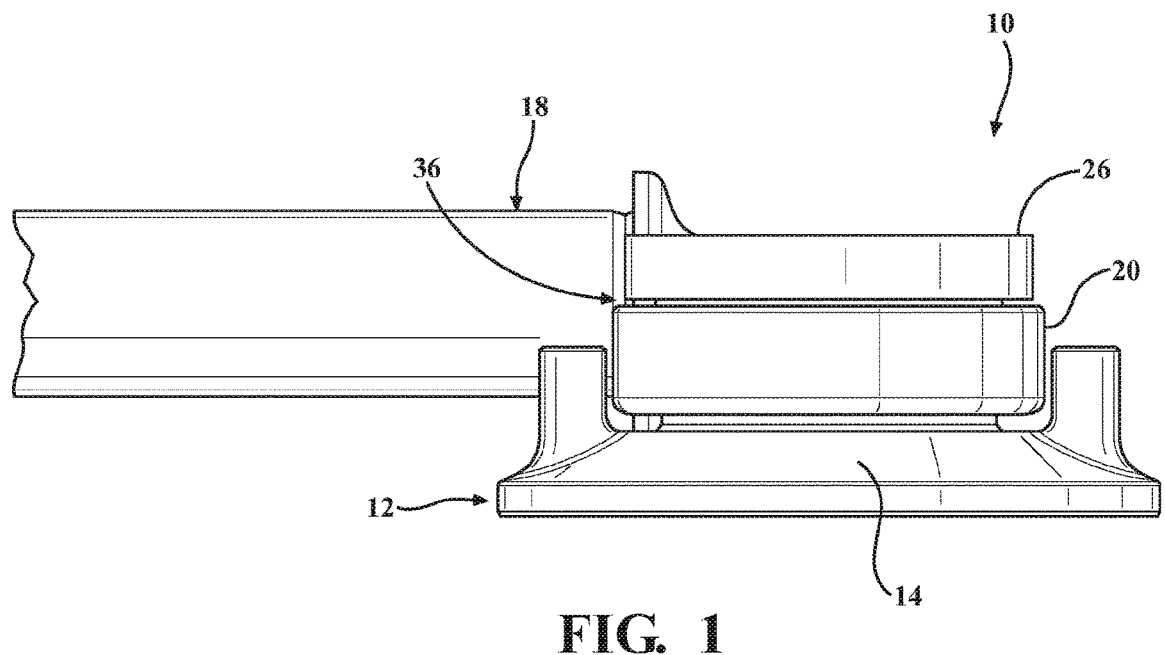
FIG. 1 is a side view of a wastegate assembly.
Figure 2:
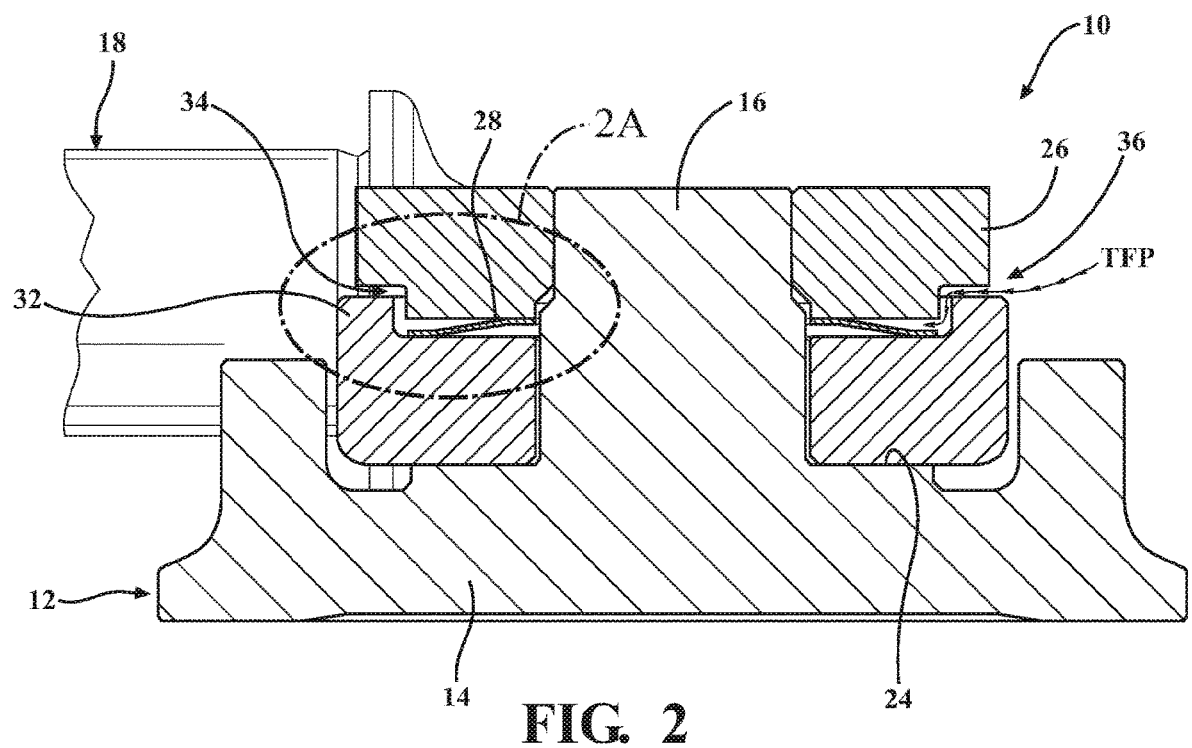
FIG. 2 is a partial cross-sectional view of an embodiment of the wastegate assembly with a spindle head, a washer, a biasing member, and a valve element shown in cross-section.
Figure 3:
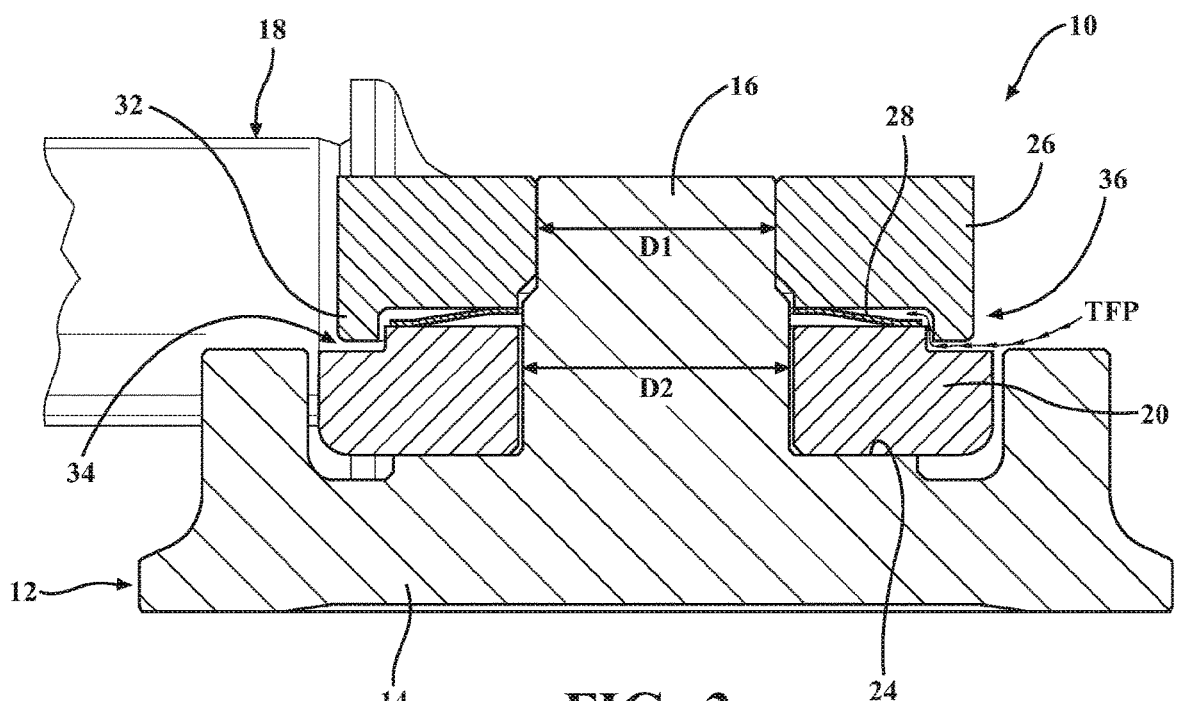
FIG. 3 is a partial cross-sectional view of an embodiment of the wastegate assembly with the spindle head, the washer, the biasing member, and the valve element shown in cross-section.
Figure 4:
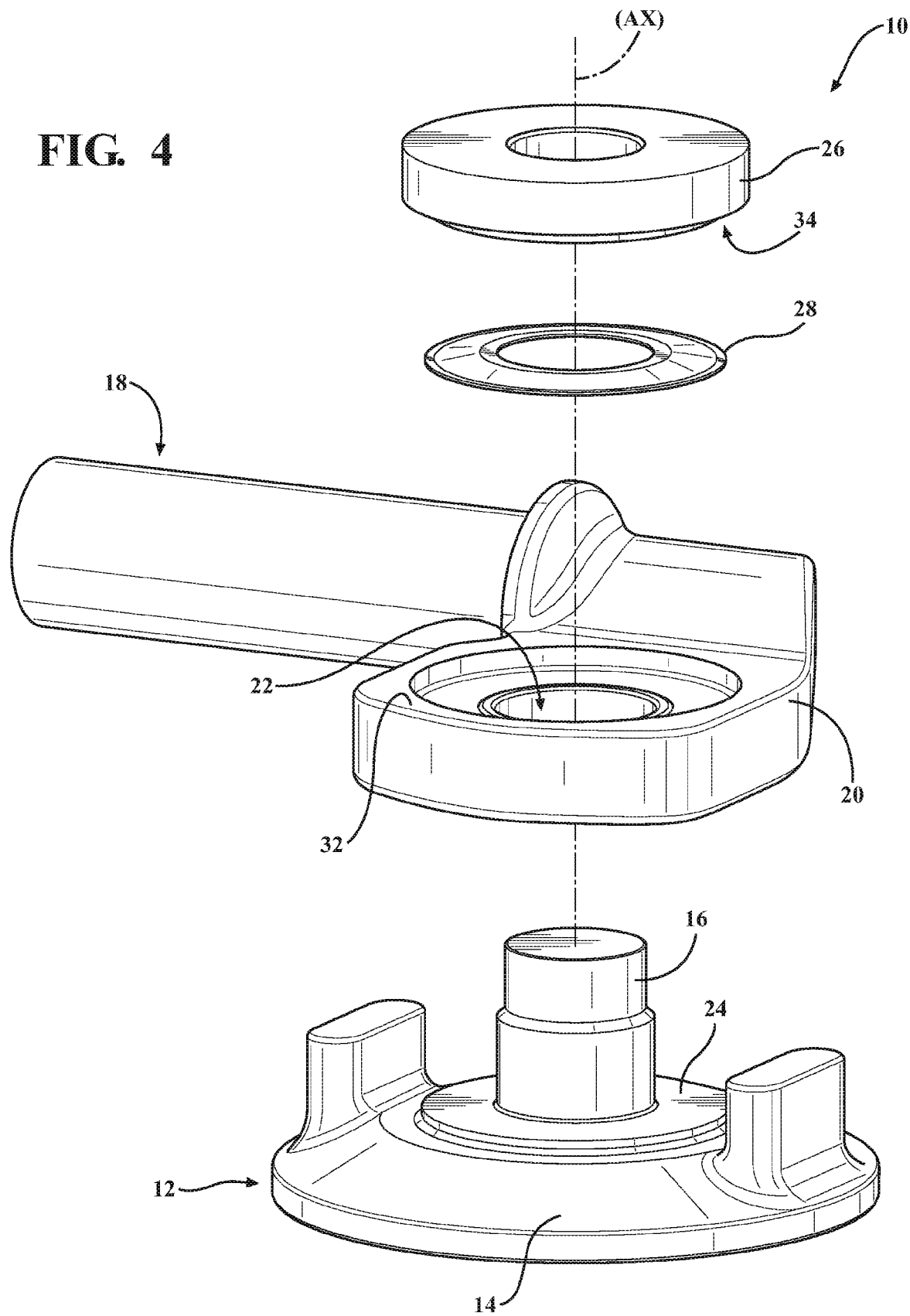
FIG. 4 is an exploded view of an embodiment of the wastegate assembly.

As shown in FIGS. 1-4, the wastegate assembly 10 includes a valve element 12 having a valve body 14. The valve element 12 also includes a valve shaft 16 extending away from the valve body 14. As best shown in FIG. 4, the valve shaft 16 extends along an axis (AX). When the wastegate assembly 10 is in the first position, the valve element 12 prevents exhaust gas from bypassing the turbocharger. In contrast, when the wastegate assembly 10 is in the second position, the valve element 12 is positioned to allow at least a portion of exhaust gas to bypass the turbocharger.

As further shown in FIGS. 1-4, the wastegate assembly 10 also includes a spindle 18, which is also commonly referred to as a lever. The spindle 18 is typically coupled to the actuator for moving the wastegate assembly 10 between the first and second positions. As best shown in FIG. 4, the spindle 18 includes a head 20 defining an opening 22 for receiving the valve shaft 16. Because the spindle 18 receives the valve shaft 16, when the actuator acts upon the spindle 18, the valve element 12 is moved through its connection to the spindle 18. As shown in FIGS. 2-4, typically the spindle 18 abuts the valve element 12 at a top surface 24 of the valve body 14.

As shown in FIG. 2, a washer 26 is coupled to the valve shaft 16 and spaced from the spindle 18 along the axis (AX) such that the spindle head 20 is disposed between the valve body 14 and the washer 26 for securing the spindle 18 to the valve shaft 16. Typically, the washer 26 is welded to the valve shaft 16. Of course, the washer 26 may be attached to the valve shaft 16 by any suitable means, such as, for example, a compression fit or mechanical interlock. It is to be appreciated that the washer 26 secures the spindle 18 to the valve shaft 16 because coupling the washer 26 to the valve shaft 16 effectively sandwiches the spindle head 20 between the valve body 14 and the washer 26. Said differently, because the washer 26 is attached to the valve shaft 16 and sandwiches the spindle head 20 between itself 26 and the valve element 12, the washer 26 effectively secures the spindle 18 to the valve shaft 16 despite the fact that the spindle 18 itself may not be directly or absolutely fixed to the valve shaft 16 via a weld or some other form of mechanical attachment.

As shown throughout FIGS. 2-4, the wastegate assembly 10 further includes a biasing member 28 disposed between the spindle head 20 and the washer 26. The biasing member 28 typically reduces or eliminates rattling or vibration or any sound that would otherwise occur from the spindle head 20 vibrating and/or moving between the valve element 12 and the washer 26. Any suitable biasing member 28 for reducing or eliminating rattle may be used. Although not required, in certain embodiments, the biasing member 28 is a cup spring. As best shown in FIG. 4, when the biasing member 28 is the cup spring, the cup spring is disposed around the valve shaft 16, which retains the position of the cup spring between the washer 26 and spindle head 20.

Referring back to the valve shaft 16, although not required, the valve shaft 16 typically has a circular cross-sectional shape. The diameter of the valve shaft 16 may also advantageously vary to assist with the assembly of the wastegate assembly 10. For example, as shown in FIG. 3, the valve shaft 16 may have a first diameter (D1) about the washer 26 and a second diameter (D2) about the spindle head 20 with the second diameter (D2) being relatively larger than the first diameter (D1). This configuration assists with assembling and locating the spindle head 20, biasing member 28, and washer 26 about the valve shaft 16. For example, when the opening 22 of the spindle head 20 is initially disposed around the valve shaft 16, the diameter of the valve shaft 16 is the first diameter (D1) (i.e., the smaller of the diameters), which easily allows the opening 22 to be disposed around the valve shaft 16.

The wastegate assembly 10 further includes a protective shield 36 to reduce the exposure of the biasing member 28 to high temperatures and/or corrosive exhaust gas. More specifically, as best shown in FIGS. 2-3, one of the spindle head 20 or the washer 26 includes a raised lip 32 extending towards the other of the spindle head 20 or the washer 26. The other of the spindle head 20 or the washer 26 then defines a notch 34 that is configured to at least partially receive the raised lip 32 and configured to cooperate with the raised lip 32 to establish the protective shield 36. For example, the cooperation of the raised lip 32 and the notch 34 (i.e., the protective shield 36) block the biasing member 28 from view in the side view of the wastegate assembly 10 shown in FIG. 1. This is because the biasing member 28 is shielded by the cooperation of the raised lip 32 and the notch 34. Notably, the protective shield 36 reduces the exposure of the biasing member 28 to corrosive exhaust gas and also reduces the overall temperature of the biasing member 28. In fact, comparative testing has shown the biasing member 28 having a temperature of 100° C. less when the protective shield 36 is included in the wastegate assembly 10 as opposed to when the protective shield 36 is not included. It should also be noted that although air/gas is capable of reaching the biasing member 28, the flow path necessary to reach to the biasing member 28 is tortuous (TFP, FIGS. 2 and 3), which results in a relatively lesser amount of exhaust gas reaching the biasing member 28 as compared to embodiments excluding the protective shield 36. Thus, for at least these reasons, the protective shield 36 extends the service life of the wastegate assembly 10, including the service life of the biasing member 28.

Figure 2A:
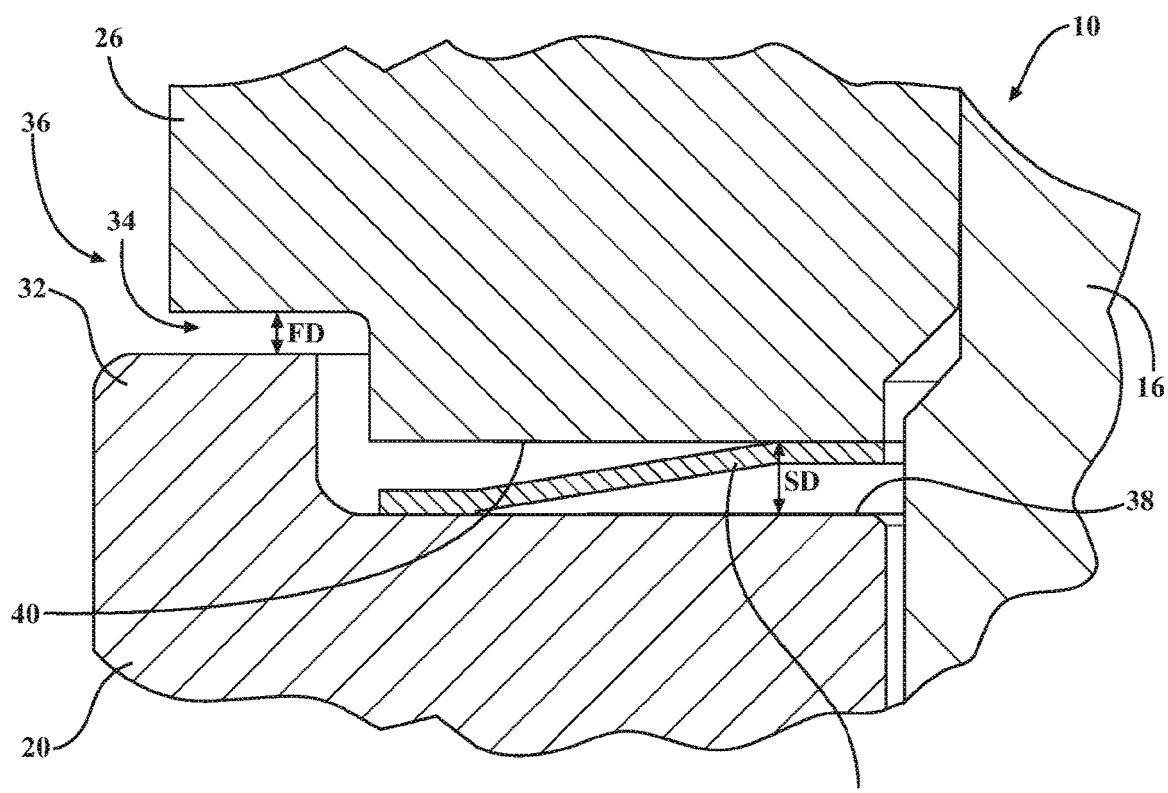
FIG. 2A is an enlarged view of a portion of FIG. 2.

Although not required, as shown in FIGS. 2 and 2A, when the wastegate assembly 10 includes the protective shield 36, typically, the spindle head 20 includes the raised lip 32 and the washer 26 includes the notch 34. Conversely, as shown in FIG. 3, the washer 26 may include the raised lip 32 with the spindle head 20 defining the notch 34. As illustrated in both FIGS. 2 and 3, the raised lip 32 typically extends from the outer periphery (e.g. the perimeter or circumference) of either the spindle head 20 or washer 26. In these embodiments, the biasing member 28 is laterally disposed between the raised lip 32 and the valve shaft 16.

In addition to the raised lip 32 and notch 34 cooperating to establish the protective shield 36, these two components may also cooperate to prevent the washer 26 and the spindle head 20 from over-compressing the biasing member 28. In other words, as shown in FIG. 2A, in certain embodiments a first distance (FD) between the raised lip 32 and surface of the washer 26 defining the complementary notch 34 (or vice versa if the washer 26 includes the raised lip 32 and the spindle head 20 defines the notch 34) is designed to be less than a second distance (SD) defined between the spindle head 20 and the washer 26 about the location of the biasing member 28. In particular, as shown in FIG. 2A, the spindle head 20 defines a flat surface 38 facing the washer 26 and the washer 26 defines a bottom washer surface 40 facing and spaced from the flat surface 38 by the second distance (SD). This relationship results in the raised lip 32 and the portion of the washer 26 defining the notch 34 contacting prior to the biasing member 28 being overly compressed (e.g. crushed or flattened) between the washer 26 and spindle head 20. Thus, not only does the protective shield 36 serve to reduce the exposure of the biasing member 28 to corrosive exhaust gas and high temperatures, the protective shield 36 also serves to limit the mechanical compression of the biasing member 28. These benefits collectively extend the service life of the wastegate assembly 10, including the service life of the biasing member 28. Typically, the biasing member 28 (e.g. the cup spring) is located completely between the flat surface 38 of the spindle head 20 and the bottom washer surface 40. In other words, the biasing member 28 is entirely protected by the protective shield 36.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A wastegate assembly for controlling flow of exhaust gas from an internal combustion engine and through a wastegate channel of a turbocharger, said wastegate assembly comprising:
   a valve element having a valve body and a valve shaft extending away from said valve body, with said valve shaft extending along an axis, and with said valve element moveable between a first position and a second position to control the flow of exhaust gas through the wastegate channel of the turbocharger;
   a spindle having a head defining an opening for receiving said valve shaft for moving said valve element between said first position and said second position;
   a washer coupled to said valve shaft and spaced from said spindle along said axis such that said spindle is disposed between said valve body and said washer for securing said spindle to said valve shaft; and
   a biasing member disposed between said spindle and said washer;
   wherein either:
   i. said spindle head includes a raised lip extending towards said washer and said washer defines a notch configured to at least partially receive said raised lip and is configured to cooperate with said raised lip to shield said biasing member from the exhaust gas; or
   ii. said washer includes a raised lip extending towards said spindle head and said spindle head defines a notch configured to at least partially receive said raised lip and is configured to cooperate with said raised lip to shield said biasing member from the exhaust gas.

2. The wastegate assembly of claim 1 wherein said spindle head includes said raised lip with said raised lip spaced from said valve shaft.

3. The wastegate assembly of claim 2 wherein said raised lip of said spindle head is located about an outer perimeter of said spindle head.

4. The wastegate assembly as set forth in claim 1 wherein said biasing member is disposed between said raised lip of said spindle head and said valve shaft.

5. The wastegate assembly as set forth in claim 1 wherein said biasing member is a cup spring.

6. The wastegate assembly as set forth in claim 5 wherein said washer is welded to said valve shaft.

7. The wastegate assembly as set forth in claim 6 wherein said opening of said spindle head is circular in cross-section and said raised lip is also circular in cross-section.

8. The wastegate assembly as set forth in claim 7 wherein said valve shaft includes a first diameter (D1) adjacent said washer and a second diameter (D2) adjacent said spindle head, with said first diameter (D1) less than said second diameter (D2) for aligning said spindle and said washer with said valve shaft.

9. The wastegate assembly as set forth in claim 8 wherein said raised lip and said notch are spaced from each other in said first position and in said second position.

10. The wastegate assembly as set forth in claim 1 wherein:
    said raised lip and said notch are spaced from each other in said first position and in said second position by a first distance (FD),
    wherein said spindle head defines a flat surface facing said washer and said washer defines a bottom washer surface facing and spaced from said flat surface by a second distance (SD), and
    wherein said first distance (FD) is less than said second distance (SD) for preventing over compression of said biasing member.

11. The wastegate assembly as set forth in claim 10 wherein said biasing member is completely located between said flat surface of said spindle head and said bottom washer surface.

12. The wastegate assembly as set forth in claim 11 wherein said biasing member is a cup spring.

13. A turbocharger comprising the wastegate assembly as set forth in claim 1.

14. A wastegate assembly for controlling flow of exhaust gas from an internal combustion engine and through a wastegate channel of a turbocharger, said wastegate assembly comprising:
    a valve element having a valve body and a valve shaft extending away from said valve body, with said valve shaft extending along an axis, and with said valve element moveable between a first position and a second position to control the flow of exhaust gas through the wastegate channel of the turbocharger;
    a spindle having a head defining an opening for receiving said valve shaft for moving said valve element between said first position and said second position;
    a washer coupled to said valve shaft and spaced from said spindle along said axis such that said spindle is disposed between said valve body and said washer for securing said spindle to said valve shaft; and
    a cup spring disposed between said spindle and said washer;
    wherein either:
    iii. said spindle head includes a raised lip extending towards said washer and said washer defines a notch configured to at least partially receive said raised lip and is configured to cooperate with said raised lip to shield said biasing member from the exhaust gas; or
    iv. said washer includes a raised lip extending towards said spindle head and said spindle head defines a notch configured to at least partially receive said raised lip and is configured to cooperate with said raised lip to shield said biasing member from the exhaust gas;
    wherein said raised lip and said notch are spaced from each other in said first position and in said second position by a first distance (FD);
    wherein said spindle head defines a flat surface facing said washer and said washer defines a bottom washer surface facing and spaced from said flat surface by a second distance (SD), and
    wherein said first distance (FD) is less than said second distance (SD) for preventing over compression of said biasing member.

15. The wastegate assembly of claim 14 wherein said spindle head includes said raised lip.

16. The wastegate assembly of claim 15 wherein said raised lip of said spindle head is located about an outer perimeter of said spindle head.

17. A turbocharger comprising the wastegate assembly as set forth in claim 14.

18. The wastegate assembly as set forth in claim 1 wherein said biasing member is a cup spring and is disposed between said raised lip of said spindle head and said valve shaft.

19. The wastegate assembly as set forth in claim 18 wherein said washer is welded to said valve shaft and wherein said opening of said spindle head is circular in cross-section and said raised lip is circular in cross-section.

20. The wastegate assembly as set forth in claim 18 wherein said valve shaft includes a first diameter (D1) adjacent said washer and a second diameter (D2) adjacent said spindle head, with said first diameter (D1) less than said second diameter (D2) for aligning said spindle and said washer with said valve shaft.

\* \* \* \* \*